July 22, 1958 R. R. DUSSINE 2,844,308

CIRCUITS FOR THE ADDITION AND SUBTRACTION OF NUMBERS

Filed April 15, 1952 7 Sheets-Sheet 1

INVENTOR.
ROGER ROBERT DUSSINE
BY Theodore Hafner
ATTORNEY

July 22, 1958 R. R. DUSSINE 2,844,308

CIRCUITS FOR THE ADDITION AND SUBTRACTION OF NUMBERS

Filed April 15, 1952 7 Sheets-Sheet 2

INVENTOR.
ROGER ROBERT DUSSINE
BY Theodore Hafner
ATTORNEY

July 22, 1958 R. R. DUSSINE 2,844,308

CIRCUITS FOR THE ADDITION AND SUBTRACTION OF NUMBERS

Filed April 15, 1952 7 Sheets-Sheet 3

INVENTOR.
ROGER ROBERT DUSSINE
BY [signature]
ATTORNEY

CIRCUITS FOR THE ADDITION AND SUBTRACTION OF NUMBERS

Filed April 15, 1952 7 Sheets-Sheet 4

INVENTOR.
ROGER ROBERT DUSSINE
BY Theodore Hafner
ATTORNEY

July 22, 1958 R. R. DUSSINE 2,844,308

CIRCUITS FOR THE ADDITION AND SUBTRACTION OF NUMBERS

Filed April 15, 1952 7 Sheets-Sheet 5

INVENTOR.
ROGER ROBERT DUSSINE
BY Theodore Hafner
ATTORNEY

INVENTOR.
ROGER ROBERT DUSSINE
BY Theodore Hafner
ATTORNEY

CIRCUITS FOR THE ADDITION AND SUBTRACTION OF NUMBERS

Filed April 15, 1952 7 Sheets-Sheet 7

INVENTOR.
ROGER ROBERT DUSSINE
BY Theodore Hafner
ATTORNEY

United States Patent Office 2,844,308
Patented July 22, 1958

2,844,308

CIRCUITS FOR THE ADDITION AND SUBTRACTION OF NUMBERS

Roger Robert Dussine, Paris, France, assignor to Societe d'Electronique et d'Automatisme, a corporation of France Application April 15, 1952, Serial No. 282,387
Claims priority, application France April 17, 1951
29 Claims. (Cl. 235—61)

This invention relates to improvements in the realization of circuits for addition and/or subtraction of numbers represented in binary fashion by coded trains of electric pulses.

As is well known, any number may be written in binary scale conforming with the following development:

$$a_0+a_1.2+a_2.2^2 \ldots +a_n.2^n+ \ldots$$

Coefficients $a_0$, $a_1$, $a_2$, . . . , $a_n$, . . . of the terms or corresponding powers 0, 1, 2, . . . , $n$, . . . are appropriately given the values of zero or one.

It is now customary to present such a development electrically by way of coded trains of electric pulses. The configuration of these trains, caused by presence and absence of pulses at successive pulse periods, reproduces the sequence of coefficients $a_0$, $a_1$, $a_2$ . . . $a_n$ . . . read, for example, in the sense of increasing powers of terms.

In order to achieve addition and/or subtraction of two numbers represented by two coded trains of electric pulses, it is customary to utilize circuits receiving the different pulse trains with code elements of same powers or orders entering in phase. At the same time, the entire configuration is compared, code element by code element. This means that the comparison of the two numbers is achieved term by term or figure by figure, starting with the terms of power 1 and continuing in the direction of increasing power 2, 4, 8, . . .

In such circuits means are provided which, in accordance with the comparison, produce two trains of pulses. One of these trains, say R, represents the sequence of successive figures or digits of the carries for carry-over operation. The other pulse train, say S, represents the sequence of successive figures of the corrected result of the operation. The latter pulse train is taken off as soon as being formed, and directed toward an output channel for the corrected result of operation. The carry pulse train is taken back to the input of the "comparator," while a phase delay of one code element is introduced with respect to the entering pulse trains, say A and B. This serves to achieve a correct carry-over operation. A comparator of this type, therefore, must be capable of discriminating—not merely between two values of figures, zero and one, in each of the entering pulse trains A and B, but between three values of figures, zero, one and two. This is due to the fact that each pulse must be added to the pulses if any, existing in one of the entering pulse trains, preferably coded train B, if the numerical value carried by that train is to be added to or subtracted from that carried by pulse train A. This aptly corresponds to the usual methods of writing where each carry figure is to be added to the figure of the next more significant digit of a number to be added to or subtracted from the other.

The word "comparator" is used to designate the principal circuit forming such an adding and/or subtraction operator. It should be taken in the most general sense with which it has been accepted up to now. Such a comparator has been constructed in different ways to operate on such principles as detection of pulse coincidence and anti-coincidence, or discrimination of multiple levels of pulses in a mixture of several figure pulses, or counting the number of digit pulses in each code pulse period.

Among other things, it should be well understood that the invention also relates to circuit structures which produce the pulses of the figures of carry and result trains by deriving these output pulses directly from the figure pulses of the input trains. The invention, furthermore, relates to circuit structures which produce the output pulses of carry and result by permitting or not permitting recurrent auxiliary pulses to pass across gating devices, conduction or non-conduction of which is controlled by signals directly derived from the figure pulses of the input trains.

In order to reduce certain practical difficulties encountered in building comparators for operating on multiple levels, it has been proposed to use arrangements of additive and/or subtractive operator circuits based upon decomposition into two distinctive time elements of an addition and/or subtraction operation. Such decomposition has been realized up to now by providing two "partial operators" or "half-adders" in cascade. Each of these operators, therefore, contains only one "comparator" for comparing the configuration of the two coded pulse trains. In order to simplify description, at the outset, only the case of addition will be considered.

In a first arrangement of this type, well known per se, the coded pulse trains entering as A and B, representing numbers to be added, are applied on the input of a first partial operator. This operator assures comparison of code element by code element, and delivers the result of this comparison in the form of two output pulse trains. The first of these output trains presents concrete pulses only in case no concrete pulse is apparent in the code element under consideration in one or the other of pulse trains A and B. Such condition will be defined as "Or," on the understanding that this condition is restricted. The second of these pulse trains represents concrete pulses only in case there exists in the code element under consideration a concrete pulse in one and the other of pulse trains A and B. This condition will be defined as "And." The first train "Or" represents a partial result for operation; the "And" second a partial train of carries.

The two outputs of the first partial operator are applied to two corresponding inputs of the second operator. A delay of one code element is provided in the connection between output "And" of the first partial operator and the corresponding input of the second. The second partial operator is identical with the first one, taking over comparison of pulse trains "Or" and "And". This second pulse train "Or" represents the output train "S" defined previously. Second train "And" represents a second partial train of carries. Carry-over is achieved by delaying second pulse train "And" by one code element and by taking it back to the input of the second partial operator which receives the delayed train "And" delivered by the first partial operator. The two trains "And" constitute together the train of carries "R" previously mentioned. There pulses can not coexist in time; this is evident from their mode of formation. Such an adder arrangement may be found, for instance, in U. S. Patent 2,610,790; in this patent, each "comparator" comprises an A. C. circuit and a C. circuit (anticoincidence circuit and coincidence circuit); the "Or" output as defined above, is the output from the A. C. circuit; the "And" output such as defined above, is the output from the C. circuit, in said patent.

In a second arrangement of the same type, more particularly described in copending U. S. patent application Ser. No. 276,602 and corresponding to a French application, filed March 17, 1951, the two partial operators arranged in cascade, are adapted to deliver each two pulse trains of configurations, "Or" and "And" as defined above; these two operators, however, are assembled in a different manner whereby the first partial operator receives at its two inputs the coded trains B and R, while the second partial operator receives at its two inputs the coded pulse trains A and "Or" from the first. The latter two pulse trains come from the first operator by mixture of the trains "And" of the two partial operators delayed by one code element relative to train B.

This second arrangement has been established principally for the purpose to insure in the most simple fashion the operation of calculator circuits achieving the difference of two numbers, B to be deducted from A (by identifying designations of numbers with designations of coded trains representing such numbers). It is apparent that in the operation of subtraction A—B, the figures or digits of the carries R must be added to the figures of number B. As a result, the calculator has been adjusted in such a manner that such addition is always effected in the first partial operator before an addition or subtraction be effected in the second. For this reason, the constitution of the second operator only need to be varied, whether the complete circuit would be required to function as an adder or as a subtractor. This is evidently of particular interest in case the calculator is to be made to accomplish one as well as the other of the functions of addition and subtraction in accordance with the program desired.

In order to achieve addition of a number B to a number A, and subtraction of that number B from that number A, the two numbers being expressed in binary scale and, consequently, written with two figures only, 0 and 1, we have a simple rule of operation, figure by figure. This rule is given in the following table:

| Values of figures of— | | | | |
|---|---|---|---|---|
| A | B | S | R (+) | R (−) |
| 0 | 0 | 0 | 0 | 0 |
| 0 | 1 | 1 | 0 | 1 |
| 1 | 0 | 1 | 0 | 0 |
| 1 | 1 | 0 | 1 | 0 |

The value of the figure of output or result S does not change, whether the operation is an addition or a subtraction. Only the digital values of the figures of the carries vary.

It will be seen that the subtraction carry is obtained if the following conditions are assured, any one of which is sufficient:

$A=0$ and $B=1$—$B=1$ and $S=1$ $A=0$ and $S=1$—$B=1$ and $R(+)=0$ (1) Carry R(—) is delivered by a circuit adapted to deliver a pulse each time that upon reception of a concrete pulse of train B at a given code element, it does not receive a concrete pulse from train A; in case such pulse is received, the circuit delivers no pulse at all, whether or not a train pulse B exists at that moment.

(2) Carry R(—) is delivered by a circuit adapted to deliver a pulse each time that upon reception of a concrete pulse of S (from the output "Or" of the comparator), the circuit does not receive a concrete pulse from train A at a given code element; in case such pulse is received, the circuit will not deliver a carry pulse even if a result pulse of train S exists at that moment.

(3) Carry R(—) is delivered by a circuit adapted to operate upon coincidence of concrete pulses at a given code element in both pulse trains B and S; the circuit does not deliver a carry pulse if one of the pulses of trains B and S would be absent at this moment.

(4) Carry R(—) is delivered by a circuit adapted upon reception of a concrete pulse of train B, to deliver a pulse if at that instant no additive report pulse R(+) would exist; in other words, a pulse leaving terminal "And" of the comparator; in case there exists such a pulse, the circuit does not deliver a subtractive carry pulse, even if it should receive a pulse from train B at that code element.

In practice, these circuits are realized each by means of a single tube stage connected in pulse coincidence circuit (3) or in pulse anticoincidence circuits (1, 2 and 4). In order to convert a partial operator of addition into a partial operator of subtraction, it is therefore sufficient to incorporate one of these circuits and to block thereafter the output channel of addition reports for re-injection. On the other hand, the same delay channel may be retained for returns of addition and/or subtraction carries.

From the foregoing, which partially repeats the patent application previously cited, it appears to be known to establish additive and/or subtractive calculator circuits by providing two partial operators in cascade. Incorporation of circuits delivering subtractive carries to the two partial operators of an adder of the first mentioned arrangement is also known. See, for instance, U. S. Patent 2,611,536, Barrow. It must be noted, however, that in this case both partial operators must be completed in this manner, while in the arrangement of the patent application, previously cited, this applies only to the second operator.

One of the objects of the present invention is to simplify realization of calculator circuits for addition and/or subtraction of two numbers represented by coded trains of electric pulses of the type specified.

Another object of the invention is to realize by means of calculator circuits of simplified structure, the occurrence of several simultaneous addition and/or subtraction operations extending over several pairs of numbers represented by coded pulse trains.

A more specific object of the invention is to combine a partial operator circuit for addition and/or subtraction of the type described, with means permitting simultaneously—in time interlaced relations for each code element—to execute the two sequences of operations required hitherto from two distinct partial operators connected in cascade in accordance with one and/or the other of the arrangements cited above.

A further object of the invention is to establish a calculator for addition and/or subtraction of at least one pair of numbers by combining a partial additive and/or subtractive operator with appropriate means to cause that partial operator to function in duplex in a time division type of operation for each pair of numbers. In this case, the pulses of partial result and partial carry are taken back, respectively, to the inputs of the partial operator with a pre-determined delay (*s*). This is to assure time-selective re-injection of those delayed pulses which present a phase relation defined by these delay values with respect to the coded trains entering the calculator; this is done in such a way that at each element of the code, and for one pair of coded trains entering the calculator, pre-determined operations of two distinct time intervals take place by way of a double passage across the single partial operator.

A further specific object of the invention is a partial additive and/or subtractive operator having two inputs and two outputs. Two coded pulse trains are applied in phase to these inputs. The two outputs deliver the partial result and the partial carry, respectively; the former is the output train "Or" formed by the comparator containing said partial operator. The output of the partial carry is taken for addition to the output of coded train "And" in that comparator, and for subtraction to the output of the pulse coincidence or anticoincidence detector stage in accordance with one of the arrangements previously mentioned; and if both outputs are provided in this case, only one or the other of these outputs is rendered active under control of an organ of programming operation, addition or subtraction. This control occurs over a reinjection channel for coded train "Or" delayed by a duration of less than the duration of a code element (caused by insertion of a delay element in that channel) and applied to one of the input terminals of the comparator across a time-gated switch. The latter is so controlled as to permit passage only of train pulses "Or" delayed by that predetermined value with respect to the pulses of that entry train which is applied to the comparator input at which the reinjection channel terminates. Another channel serves to take off the pulse train of the corrected final result of operation. This channel is derived from output "Or" and contains a time-gated switch so controlled as to permit only passage of those pulses of train "Or," which, delayed by the above mentioned value, occur in phase with the pulses of the coded trains entering the partial operator. A double channel of reinjection serves to feed the pulses of the carry from their output terminal of the comparator to the input terminal of the other train of that comparator. One branch of that double channel presents a delay of a duration of one code element with respect to the train pulses entering the operator; these train pulses are afterwards applied to the very same terminal of the comparator. The other branch of the double channel presents a delay equal to the very same duration of code element with respect to the same pulses plus a delay value equal to that of the first channel of reinjection. The two parallel branches of the second reinjection channel attack a time-gated switch permitting passage only of those delay pulses which are displaced by the delay value introduced into the first channel with respect to the pulses of the coded train as applied upon that input terminal of the operator or comparator which has been considered for reinjection of carries.

It should be noted that between the input terminal of the comparator receiving the carries and that terminal of the calculator, upon which the pulses of the input train are applied, which should also be applied to the very same input terminal, a delay element is inserted; its delay is less than the duration of a code element and equal to the delay of the reinjection channel for the train of partial result "Or." The delay element may assume various forms, and for this reason, the delays of the double channel of reinjection must be considered in relation to the instants of application of pulses of that pulse train on the input terminal of the calculator, and not in relation to the instants of application of pulses of that pulse train on the input terminal of the partial operator.

It should also be noted that the stage controlling the formation of subtraction carries is established in the partial operator to insure the delivery of a subtractive carry pulse in the absence of a pulse from coded entry train A, a realization according to the cases 1 and 2 described above. This control stage should equally deliver subtraction carries only in absence of pulses "Or delayed," such as are reinjected in the partial operator. It is recommended, therefore, in the realization of calculators utilizing partial operators having subtracter carry-forming circuits of these two types, to provide derivation of the reinjected pulses of the train "Or delayed" in order to apply them at the same time as the pulses of coded train A to the subtractive carry-forming circuit.

These and other objects of the invention will be more fully apparent from the drawings, in which.

Figure 3:
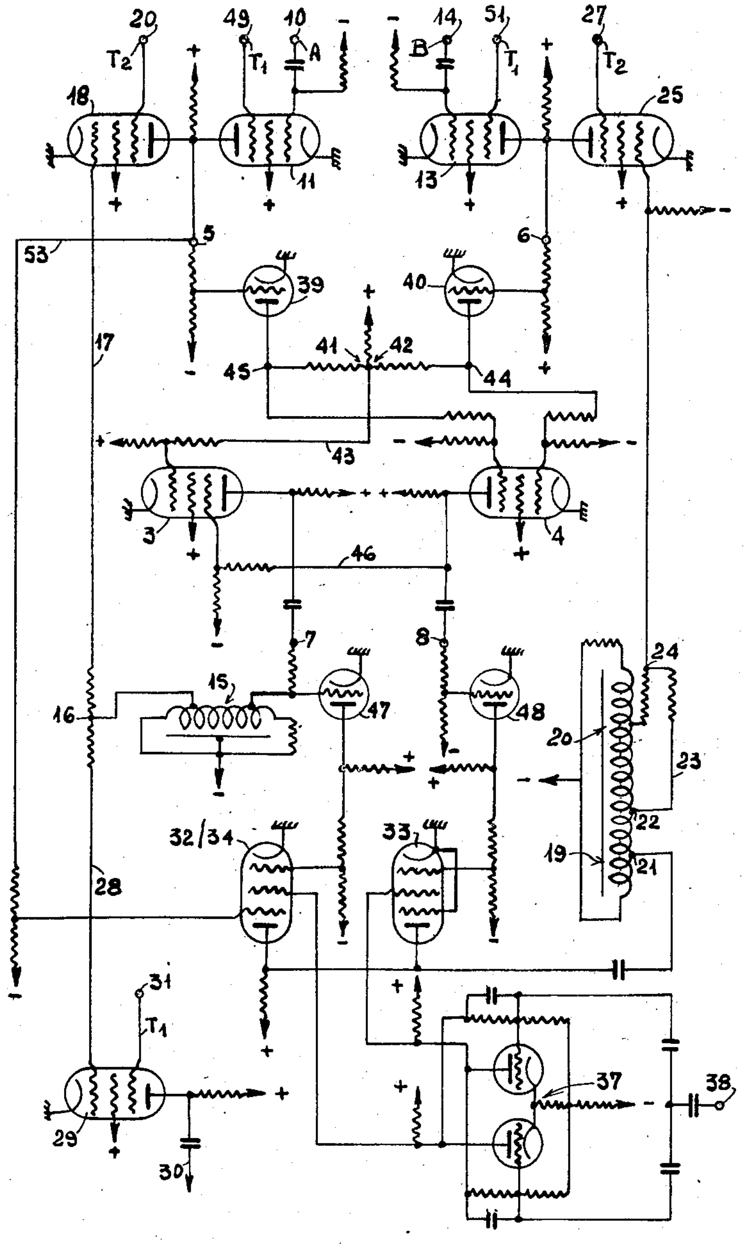
Figs. 3 and 4 represent two more detailed examples of realizing a calculator shown in Fig. 1.

In the diagram of Fig. 3, the half-adder comparator introduces no delay into the production of trains of result and carry, and imposes application in phase of the trains entering its two terminals.

Figure 4:
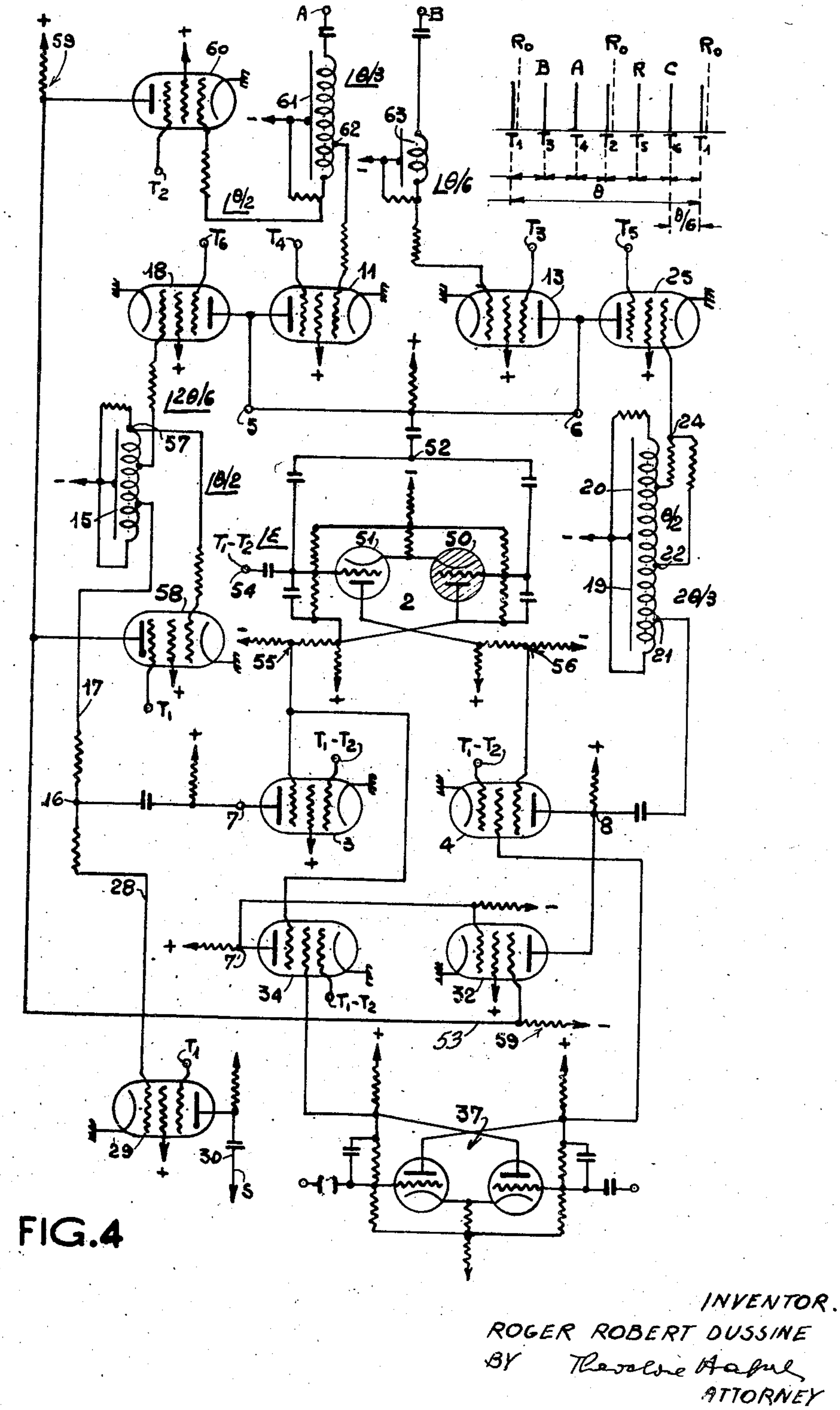

In the diagram of Fig. 4, the half-adder comparator imposes a successive application of trains entering its two terminals and, moreover, causes a certain delay for the production of the trains of result and carry.

Figure 1:
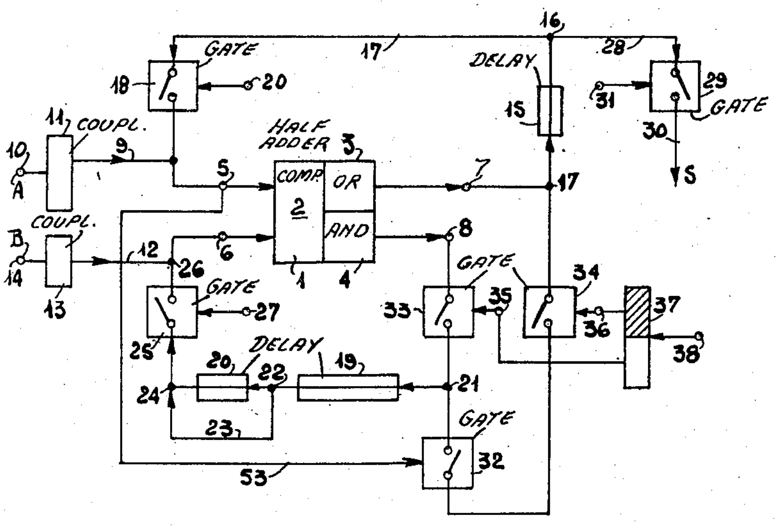
Fig. 1 represents a circuit diagram constituting a first example of a calculator conforming with the invention.
Figure 5:
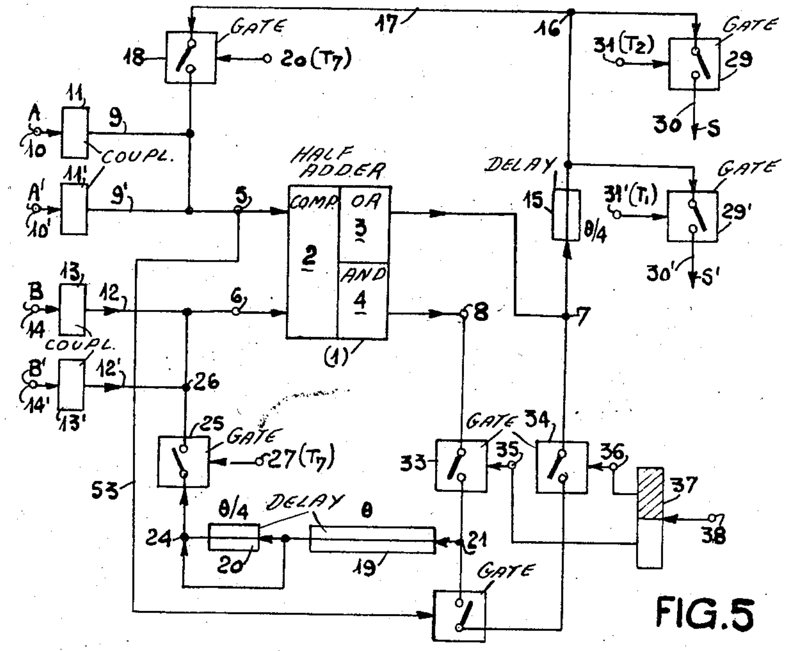
Figure 6:
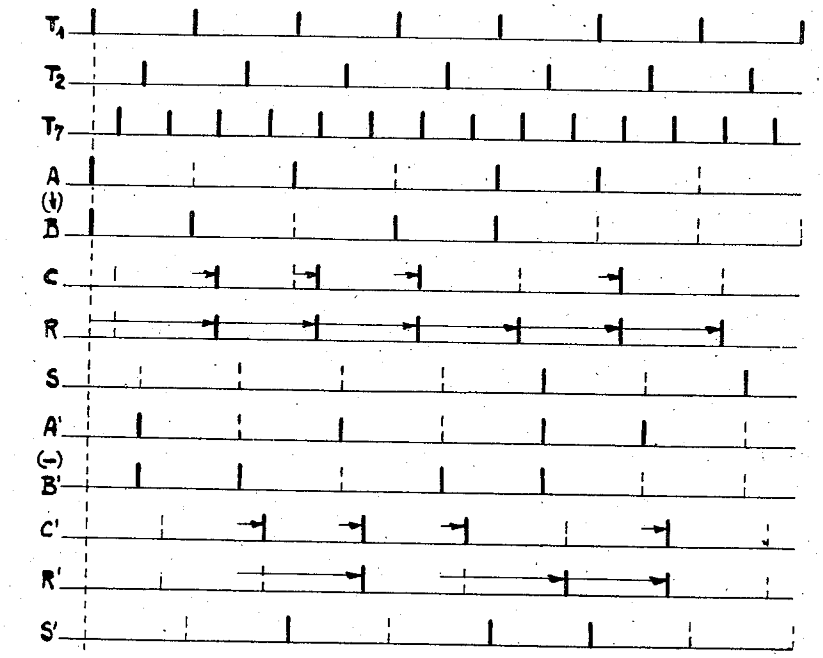
Figure 7:
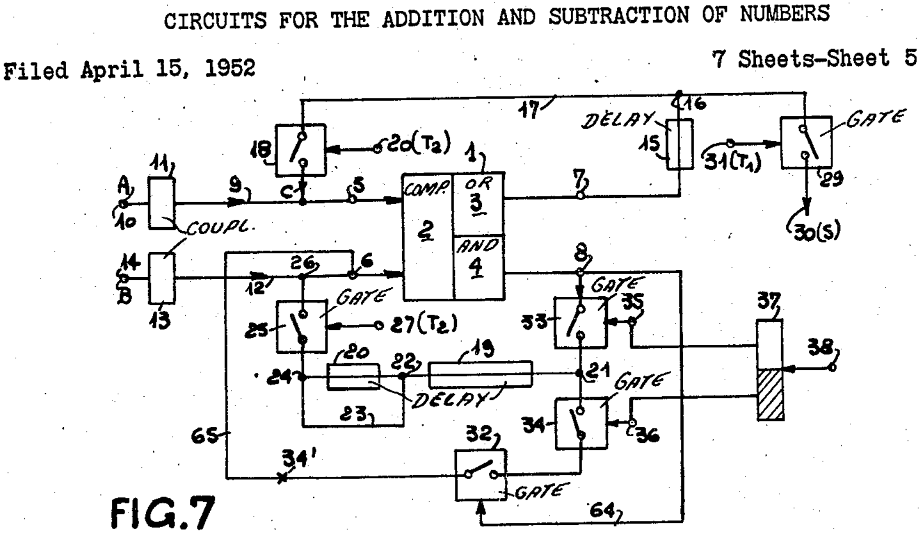
Figure 8:
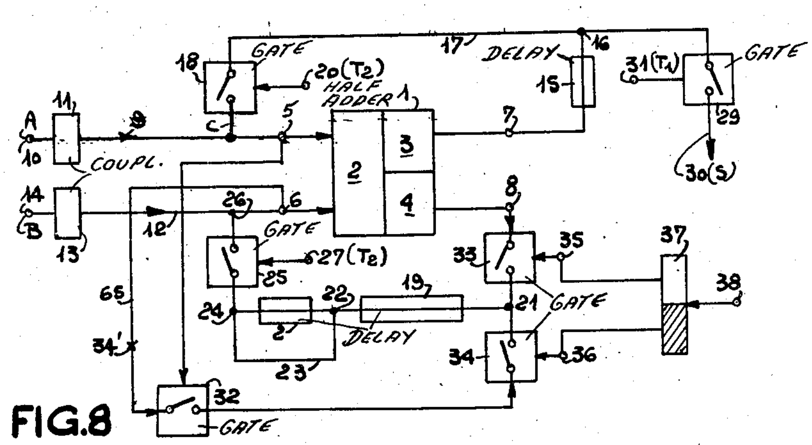
Figure 9:
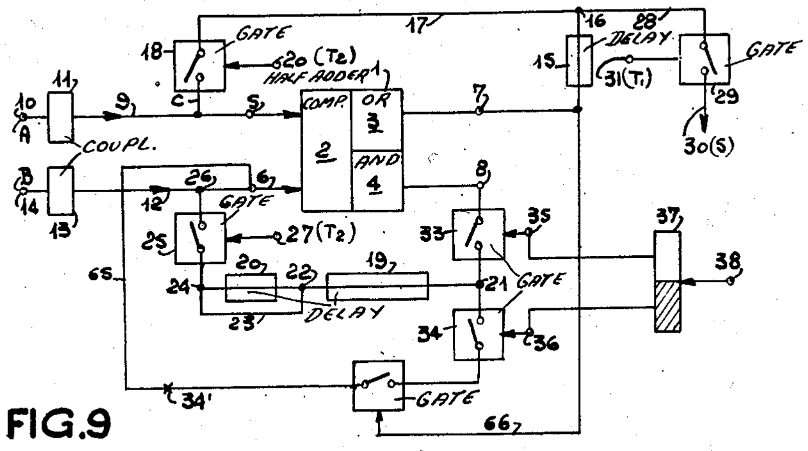
Figure 10:
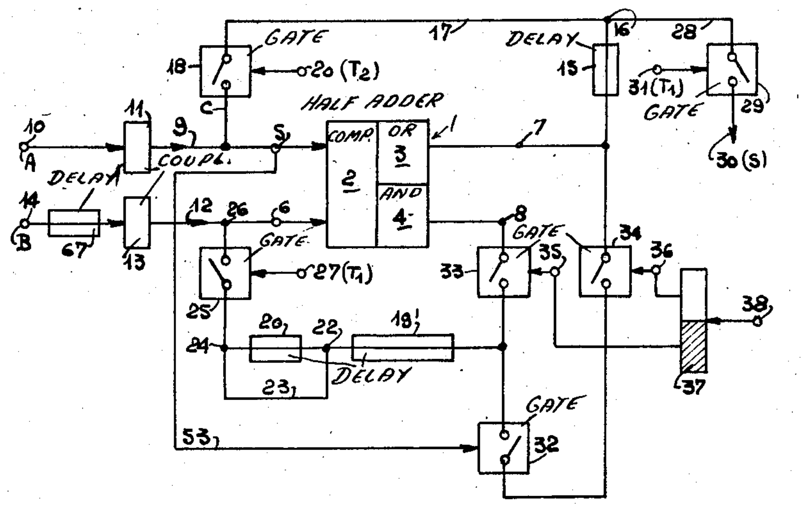
Figure 11:
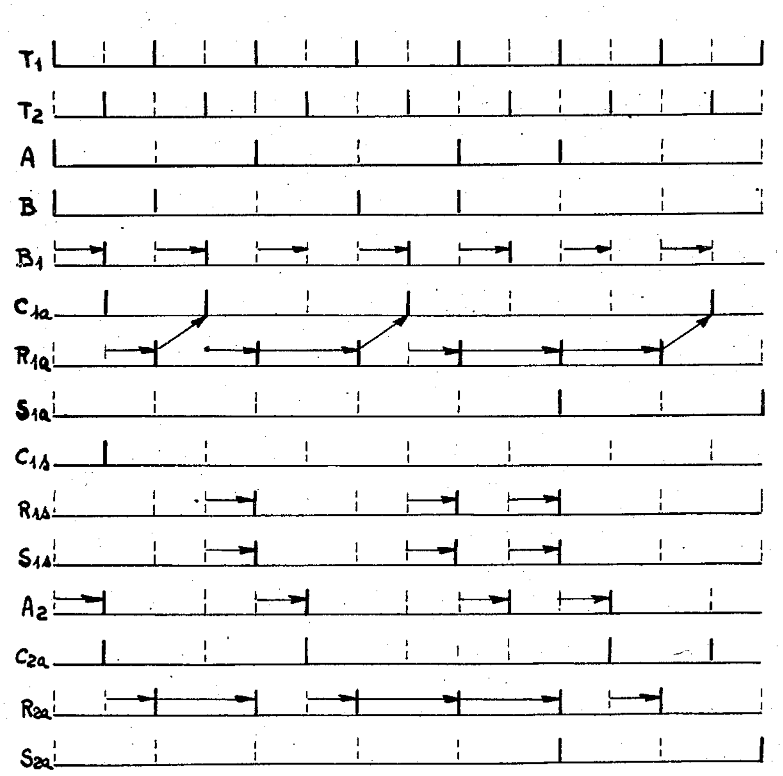
Figure 12:
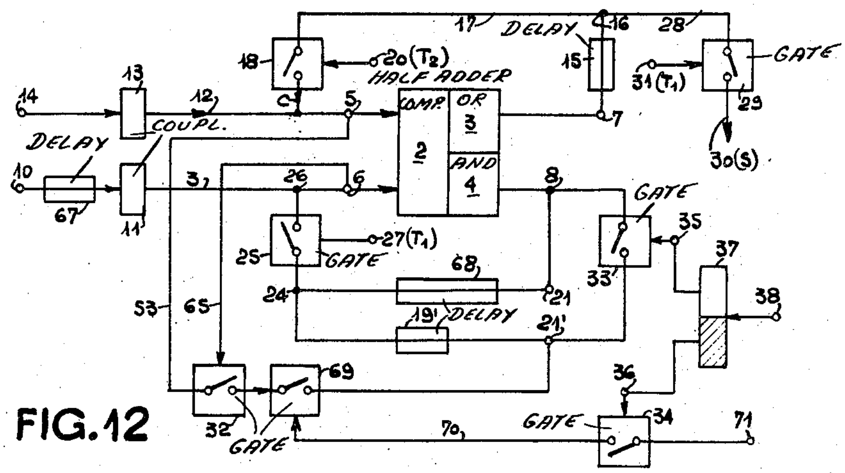
Figures 13, 14:
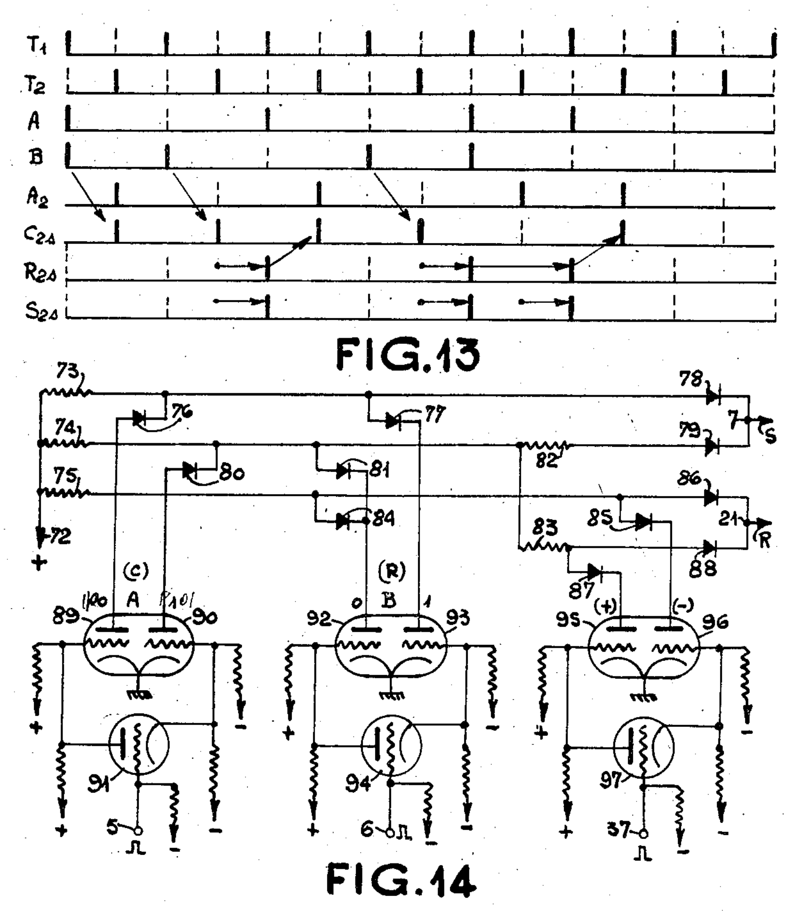

Fig. 5 shows a digram extending a calculator, such as shown in Fig. 1, to achieve two operations at the same time upon two pairs of entering code trains;

Fig. 6 is a graph illustrating the functioning of the calculator of Fig. 5;

Figs. 7, 8 and 9 represent three variations of the diagram of Fig. 1 in accordance with the different dispositions possible for the establishment of the circuit producing subtractive carry pulses;

Fig. 10 represents a variation of the diagram of Fig. 1 in case the entering coded train B is delayed by a certain value which is less than a code element, prior to its application upon the terminal of the comparator of partial operation, which also receives the carry pulses;

Fig. 11, in a graph, illustrates the functioning of the variation of Fig. 10 in case of addition and subtraction. This graph also shows, for the case of addition only, that the diagram of Fig. 10 could also be used for applying the coded train A on the calculator terminal carrying the delayed input;

Fig. 12, a modification of the diagram of Fig. 1, shows the case where the coded entry train A is delayed by a certain value which is less than a code element, and prior to its application upon the terminal of the half-adder comparator, which also receives the carry pulses. This applies to addition as well as subtraction;

Fig. 13, a graph, illustrates the functioning of the calculator of Fig. 12 in the case of subtraction; the functioning in case of addition becomes evident from the lower portion of the graph of Fig. 11;

Fig. 14 represents a modification of the half-adder comparator which can be used in any of the diagrams previously shown; this variation shows the advantage that it is not necessary anymore to provide particular arrangements for discriminating between addition and subtraction carries.

In Fig. 1, comparator 1 has an input and comparison circuit 2 and two output circuits 3 and 4. Output 3 delivers pulse train "Or" and output circuit 4 delivers output train "And". Input terminals are indicated at 5 and 6, and output terminals at 7 and 8.

Terminal 5 receives the pulses of coded train A, which are applied over connector 9 on input terminal 10 of the calculator across a coupling circuit 11. Terminal 6 similarly receives the pulses of coded train B applied through connection 12 and coupling circuit 13 to input terminal 14 of calculator 1. Output terminal 7 of train "Or" is connected in the first instance to the input of a delay element, such as line 15. Output 16 of line 15 is connected to reinjection channel 17, which across gate stage 18, permits delayed pulses "Or" through connection 19 to be applied to terminal 5. Gate 18 is of the electronic type and controlled by terminal 20, so as to permit passage of pulses at appropriate instants only—instances which are different from those of which the pulses from coded train A are applied to terminal 5. It is understood that this control is periodic and in rhythm of the code elements, or at the repetition frequency of the code elements.

Output terminal 8 of train "And" is connected to the inputs of a delay line having two consecutive sections 19 and 20. Electronic gate 23', interposed therebetween, will be discussed further below. Output of section 19, indicated at 22, is connected over 23 to the output of line 20. Common output 24 is applied to electronic gate 25, having an output 26 connected to terminal 6 of comparator 1. Gate 25 is also controlled by terminal 27 in the rhythm of the code elements permitting passage of pulses at appropriate instants only, instances which are different from those at which the pulses of coded train 5 are applied to terminal 6. It is well understood that, in order to assure two delays in their reinjection channel, it is also possible without exceeding the scope of the invention (and sometimes necessary, as will be seen further below) to provide two distinct delay branches in parallel between points 21 and 24 one for delaying section 19, the other for producing a delay equal to the sum of the delays of sections 19 and 20.

Point 16 is connected over 28 to the input of an electronic gate 29, the output 30 of which delivers the pulses of the net result of operation from delayed train. "Or" gate 29 is controlled by terminal 31 in the rhythm of the code elements at appropriate instants so that from delayed train "Or" only those pulses are transmitted as result pulses that due to their phase cannot feed back over interruptor 18 into the input 5 of comparator 1.

It is assumed that the comparator does not introduce any transmission delay between terminals 5—6 and 7—8 and that coded trains A and B are applied in phase on terminals 5 and 6; $\theta$ be the duration of a code element. Delay lines 15 and 20 are chosen of an electrical length imparting a delay of $\theta/2$ on the pulses passing these lines. Line 19 may have an electrical length assuring the delay $\theta$. Gate 29 is then controlled by applying on 31 an uninterrupted sequence of pulses $T_1$ at a rhythm $\theta$ in phase with the application of coded trains A and B on terminals 5 and 6. Gates 18 and 25 are controlled by applying on terminals 20 and 27, respectively, an uninterrupted sequence of pulses $T_2$ of rhythm $\theta$ out of phase by $\theta/2$ with respect to the application of coded trains A and B on terminals 5 and 6, the same out-of-phase relationship also existing with respect to pulse sequence T.

The arrangement described up to now for Fig. 1 assures function of the device in addition. In order to assure function at subtraction, it is necessary in this arrangement to modify the connection of the gates. In Fig. 1, this will be achieved by feeding output terminal 7 over electronic gate 22 back to point 21 of the re-injection channel for the carries. Gate 32 is controlled by line 43 taken from input terminal 5 or special outputs of circuits 11 and 18 commoned to line 53—so as to render gate 32 nonconducting any time there exists a concrete pulse in one or the other of the coded trains applied on input terminal 5, i. e. train A and the train of the reinjected partial result, say C.

Since the calculator is to provide the two modes of operation each of the connections of terminal 8 for addition, and of terminal 7 for subtraction, must be conditioned so as not to enter in operation except when required. Connections of terminals 8 and 7 to point 21 pass over electronic gates 23 and 24 which only become conductive alternatingly to transmit addition and subtraction carries under control of their respective terminals 35 and 36. This can be realized by making stages 33 and 34 normally nonconductive. One of them is rendered conductive by applying in the course of operation on the corresponding terminal a sequence of recurring deblocking pulses of rhythm $\theta$ and in phase with the output pulses of the comparator. Alternatively one of these stages is rendered conductive only at intervals desired for operation. This is done by closing a gate for applying high plate voltage which is not applied in general rest condition. Use can also be made of the reciprocal disposition of two conducting stages one of which is rendered nonconducting at will. Since such deblocking is caused to last for a complete cycle of operation and generally is controlled by the program of the machine or system containing the calculator, it is simple to condition the device, as indicated, by connecting terminals 35 and 36 to the output plates of the two tubes of a flip-flop stage of double stability. It will then be sufficient at the start of operation to apply or not to apply a control pulse terminal 38 of the stage to determine the nature of the operation conducted. The flip-flop stage of the diagram is presented in position of addition. Application on 38 of a control pulse for the stage of double stability of 37 inverses, therefore, the conditions of the pair of tubes. Gate 33 will be blocked while gate 34 rendered conductive. The circuit will then function to subtraction.

It should be noted from now on that inversion on the diagram of the signal and control inputs of gates 18, 25 and 29 will not modify organization and function. In this case, the pulse voltages at 17, 21 and 28 will be used to deblock those gates which, while normally nonconductive, would in any case and permanently receive at their inputs pulse sequences $T_2$ and $T_1$ mentioned above. Of these pulses, evidently, only those will be transmitted which coincide with the deblocking voltages of channels 17, 22 and 28.

If now half-adder 1 introduces a transmission delay between its terminals 5—7 and 6—8, without however necessitating an out-of-phase condition between entering trains, it will be sufficient for reestablishing the above mentioned conditions, to reduce by that delay the length of lines 15 and 19, and to retard by the same value pulses A at connection 53. If stages 33 and 34 are controlled by recurring pulses, these pulses will also be retarded by that value.

If now the operator having an inherent transmission delay, causes a certain additional displacement in its inputs 5 and 6, it would be possible to maintain a phase difference of $\theta/2$ between trains A and C at terminal 5, on the one hand, and between trains B and R at terminal 6 on the other hand, at the same time assuring by an additional delay in one and/or the other input a displacement of one and/or the other of these train pairs.

Such modifications do not introduce any appreciable variation in the operation of a calculator according to diagram of Fig. 1. Such operation will be explained in greater detail in the case of a calculator without inherent transmission delay and without relative phase-shift displacement of inputs. Reference will be had to the numerical example given in the pulse graphs of Fig 2 in which train A represents 53 and train B part 27.

At the first code element there exists a pulse in train A and a pulse in train B. These pulses when applied on comparator 1, assure passage from terminal 8 of a pulse of train "And". In the case of addition, stage 33 is conducting and stage 34 nonconducting. Pulse "And" is transmitted to point 21, the input of the reinjection channel; it will arrive delayed by 24 at the output of 22 of section 19, at the start of the second element at which gate 24 is nonconductive. This pulse, therefore, will not be transmitted. It will, however, present itself again at 24 after having received an additional delay at 20, and this will occur at time $\theta/2$ of that second element. At that instant, gate 25 is rendered conductive by $T_2$. Our pulse, therefore, will be applied on terminal 6 together with the first pulse of the carry train of addition $R_a$.

At the start of the second code element, a pulse of train B presents itself at 6. This pulse alone causes production at terminal 7 of a pulse of train "Or." This pulse delayed by $\theta/2$ in delay element 15, is fed back over gate 18 to terminal 5, gate 18 being rendered conductive at this instance by pulse $T_2$. At $\theta/2$, therefore, of the second code element, two pulses, one of train C and the other of train $R_a$, will coexist at terminals 5—6 of the comparator which delivers a carry pulse at terminal 21.

This pulse delayed by $\theta$ in section 19 will arrive at 24 at $\theta/2$ of the third code element; at this instance stage 25 is rendered conductive and a carry pulse will then be re-applied on terminal 6. However, at the start of the third code element, input terminal 5 will have received a pulse of train A, a pulse which alone has provoked the appearance at 7 of a pulse of train "Or". This pulse delayed by $\theta/2$ in 15, passes gate 18 and arrives at terminal 5 at the same instance as the carry pulse arrives at terminal 6. The comparator delivers again a pulse of train "And" at its terminal 8.

On the other hand, the carry pulse which has been delayed by 1.5 $\theta$ in series connected section 19 and 20, will arrive at stage 25, while the latter is blocked. It will not be applied on terminal 6.

Figure 2:
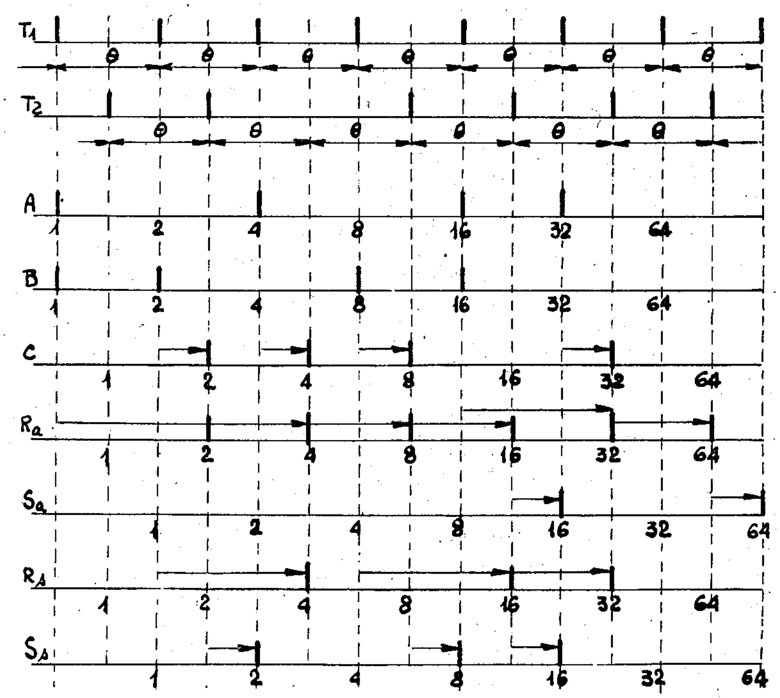
Fig. 2 illustrates graphically, for a particular example of numerical values, the functioning of a calculator as shown in Fig. 1.

Since the conditioning of this carry mechanism appears to have been sufficiently clarified, it is not believed to be necessary for the rest of the description to explain anything except active carry pulses, whether they are being derived from terminal 22 or terminal 24 of the delay channel for carry-over operation. In Fig. 2, only effective delays for carry pulses have been indicated.

At the start of the fourth code element, the pulse of train B arriving alone causes occurrence of a pulse of train "Or" which, after having been retarded by $\theta/2$, is reinjected as pulse of train C at 5. Carry pulse $R_a$ of the third code element arrives at the same instance as the fourth code element at terminal 6 and the comparator delivers a pulse of train "And" of terminal 8. This carry pulse, together with the carry pulse will be fed back to terminal 6 at $\theta/2$ of the fifth code element.

Up to now, none of the pulses of train "Or" delayed by $\theta/2$ has presented itself at 16 in phase with pulses $T_1$. For this reason, there was no output pulse; gate 29 has not been open when pulses arrived at 28.

At the start of the fifth code element a pulse of train A and a pulse of train B are simultaneously applied on terminals 5—6. The operator delivers a pulse at output 8. The report pulse of the fourth code element arrives alone at $\theta/2$ of the fifth element and as a result a pulse of train "Or" is delivered. This pulse delayed by $\theta/2$ in 15, arrives therefore at 16 at the instance at which stage 29 is rendered conductive by a pulse of sequence $T_1$. An output pulse of the addition result is transmitted at channel 30. The pulse of delayed train "Or" will not be transmitted by gate 18 which is nonconductive.

At the start of the sixth code element, a pulse exists alone in train A and the comparator delivers at 7 a pulse which, after delay at 15, furnishes at 5 a pulse of train C at $\theta/2$ of the sixth code element. This pulse of train C coexists with a carry pulse coming from output 8 at the fifth code element. Half-adder 1 delivers again a pulse of train "And" at 8.

At the seventh code element, the report pulse of the sixth element will exist alone at $\theta/2$. A pulse of train "Or" is delivered and after having been retarded at 15, arrives at 16 at the start of the eighth code element. At that instance, this pulse is taken off as a result pulse of train $S_a$ by passing gate 29 which is rendered conductive at this instance.

Since no pulse has been fed back nor applied on input terminals 5—6 of the comparator, operation stops and addition is terminated. It should be noted that the addition train taken off at 30, is in fact displaced by one code element with respect to entering trains A and B. In order better to define the weights of the elements at the various points of the calculator, the values of these weights have been written in Fig. 2 underneath their pulses instances.

For an operation of subtraction, stage 33 is now rendered nonconducting and stage 34 conducting. Referring now to the same numerical examples, the apparatus functions as follows:

At the first code element, there exists a pulse in train A and a pulse in train B. Circuit 1 delivers a pulse at output 8 which is without effect.

At the second code element, the pulse of train B occurring alone causes appearance of a pulse of train "Or" at terminal 7. This pulse passes gate 34 and also interruptor 32, because there is no pulse in train A. This pulse therefore constitutes a carry pulse which will be carried-over at terminal 6 at $\theta/2$ of the third code element.

At the start of that third code element, a pulse of train A applied alone delivers a pulse at 7. This pulse, however, cannot pass gate stage 32 which is then rendered nonconductive by the pulse of train A itself. In any case, at this very instant, an output pulse is transmitted through gate. This output pulse results from the pulse of train C which at $\theta/2$ of the second code element has passed gate 18, and which delayed again in 15 by $\theta/2$ presents itself at 16, at that start of the third code element.

The pulse delivered at 7 at the start of the third code element, is delayed in 15 and fed back to terminal 5 over gate 18; and thereafter at $\theta/2$ of the third code element, two pulses coexist, one of train C of terminal 5, the other of the subtraction carry train S at terminal 6. The latter pulse originates from the carry pulse of the second code element. Comparator 1 delivers a pulse at 8 which is without effect.

It should be noted that at $\theta/2$ of the second code element, a parasitic carry could have been provoked by the output pulse "Or" of that code element. Since the pulse of train C is also applied on stage 32 over line 53, the parasitic carry has not been transmitted. As a matter of fact, in this case the parasitical carry would not have been troublesome. Its arrival would have coincided with that of the carry pulse caused by the pulse of train B of that second code element. This would not have been the case if pulse C would have been provoked by a pulse of train A alone. In this case the parasitic carry, if not blocked, would have reached effectively terminal 6 at an undesirable instant and as a result would have falsified calculation. It follows that each pulse of train C must intervene in the same fashion as each pulse of train A, at least as far as the subtraction carries are concerned. Furthermore, stage 32 must be blocked by train A as well as train C.

At the fourth code element of the subtraction operation, a pulse of train B alone is applied on terminal 6. The comparator delivers a pulse at terminal 7 which on one side, after a delay of $\theta/2$ is reapplied on terminal 5. There a new pulse results at 7 which $\theta/2$ later appears at 16 without causing a carry, i. e., at the start of the fifth code element. This pulse is selected by gate 29 as a pulse of the corrected output train. Interruptor 29 is rendered conductive at that instance by a pulse $T_1$. On the other side, the first pulse leaving 7 in the fifth code element, resulting from a pulse of train B, is transmitted as a carry pulse through gate 32 which is conducting. The corresponding carry pulse will arrive at gate 25 at an instant where said gate is rendered conducting by a pulse $T_2$ at $\theta/2$ of the fifth code element.

At this fifth code element, terminals 5 and 6 receive, first, each a pulse of coded trains A and B. There results a pulse at 8 which is ineffective. At $\theta/2$ of the fifth code element, there arrives the above mentioned carry pulse which controls the appearance of a pulse of train "Or" at terminal 7. This pulse is transmited by stage 32 for an ultimate carry. This pulse is also delayed in 15 and selected as a pulse of the output result train through gate 29, but cannot pass stage 18.

In the numerical example under consideration, a pulse of train A appears now on terminal 5 at the start of the sixth code element. The pulse resulting at terminal 7 is not transmitted by stage 32 but delayed. It arrives at gate 18 when the latter is conductive, and as a result at $\theta/2$ of the sixth code element, a pulse of train C will coexist at terminal 5 with the carry pulse of train $R_a$ at terminal 6. The comparator output delivers only a pulse at its output 8 which is ineffective. The operation stops subtraction having been correctly achieved. However, as in the case of addition, the result train $S_s$ is displaced by one code element with respect to entering trains A and B.

The actual circuits constituting the calculator arrangement just described may be considered known per se in the techniques of transmission of electrical coded pulse trains. However, in order better to enable the invention to be readily carried into practice, two electronic lay-outs are given herewith, without limiting the invention in any way whatsoever.

Referring to Fig. 3, half-adder 1 between terminals 5—7 and 7—8, contains input circuit 2 consisting of two coupling tubes, 39 and 40, for example triodes. Coded trains A—C and B—R are applied to the grids of these triodes in negative polarity of the pulse voltage. These tubes produce therefore positive pulses. Their output plates are connected at one side to the two ends of a resistance mixer 41—42; the electric midpoint of mixer 41—42 is connected to the control grid input of stage 3 to deliver pulses "Or" at terminal 7 connected to its output plate. Resistance values 41—42 are such that the pulses delivered by one of the tubes cannot sensibly alter the output potential of the other. On the other side the output plate of tube 40 controls for example over 44 the grid of a tube 4 while the output plate of tube 39 is connected over 45 to the third or suppressor grid of same tube 4. This tube therefore, will compare the output voltages of tubes 39 and 40 and is arranged as a coincidence detector. It will not deliver pulses at its plate, unless tubes 39 and 40 operate simultaneously, i. e. upon existence of concomitant pulses in entering trains A—B and C—R. Output of tube 4 connected to terminal 8, furnish pulses "And."

This output also serves for deriving therefrom continuous current at 46, to control tube 3 in such a manner as to render tube 3 nonconducting each time tube 4 operates. In this way, tube 3 will transmit such output of pulses only which correspond to the presence of a concrete pulse in one or the other of the entering trains, A—B or C—R but not both. It thus delivers the coded train "Or" defined above. This is done by means of cancellation voltages from train "And" acting over 46 upon its third grid.

Referring now to the diagram of Fig. 3, output terminals 7 and 8 are connected over polarity inverting stages 47 and 48 to the control grids of their respective subtraction and addition carry-forming tubes 32/34 and 33 respectively. Tube 32/34 assures by its arrangement the two functions of interruptors 32—34 in the diagram of Fig. 1. However, this concentration of functions is not essential and it is necessary to maintain two tube stages in cascade if the conditions involving double control of a single stage become too critical for the security of operation. As already explained, one of tubes 33 and 32/34 is alone active for one type of operation They are under control of plate voltages received for example from a bistable flip flop stage. The arrangement of such flip flop stage represented at 37 is known and need not be described in detail. The conducting tube of the stage reduces plate tension of the corresponding carry-forming tube in order to make it nonconducting.

The pulses of trains of A and C appearing at terminal 5 and mixed in timed relation are applied in negative polarity on the suppressor grid of tube 32/34. The normal potential of the suppressor grid of tube 32/34 is such that the tube will be conductive (potential near ground). The negative pulse voltages reduce this potential and cut the tube off. Carry-forming tubes 33 and 32/34 are connected at their outputs to the input 21 of a delay line, containing two series sections, 19 and 20 defined by terminals 22 and 24 spaced apart by $\theta/2$. Point 24 connected to point 22 over 23, is in turn connected over tube 25 to input terminal 6. Tube 25 serves to control the transfer of the carry output pulses from terminals 22 and 24 under control of pulses $T_2$ applied to its suppressor grid in positive polarity. The occurrence of these pulses will render less negative the potential of that grid and will make tube 25 conducting.

Delay line 19—20 terminates upon its matching impedence but it is also terminated at its input end by a short circuit. Input terminal 21 is located at a point of the line which is distant from the short circuit so that the pulses furnished by one or the other of tubes 33 and 32/34 in negative polarity are propagated in both directions and after reflection at the short circuit will be converted to positive pulses and will reappear as positive pulses at the input tap. In fact each pulse entering the circuit will then be inserted in a curved pulse signal. As a result the D. C. component of the carry pulse train will not have to be restored at the output of the line. The distances between input terminal 21 and output terminals 23 and 24 are such that the positive component pulses reach the control grid at the instants at which the pulses $T_2$ are applied on that tube at 27. At these instants, therefore, each pulse received from the line will be reshaped by the corresponding pulse $T_2$, and stage 25 will deliver an R pulse.

Tube 13 which has a plate output common with that of tube 25, receives the pulses of entering coded train B at its control grid over terminal 14. This tube is also controlled by the reshaped pulses $T_2$.

The pulses of train C are derived from the pulses appearing at 7. These pulses are delayed in line 15 of a construction similar to that of line 19—20, i. e., short circuited at one end. The delay imparted to the positive pulses thus developed is $\theta/2$.

Branch 28 originates at point 16 and extends to the control grid of tube 29. This stage is rendered conductive only at instances when pulses $T_1$ are applied at its suppressor grid. In this way the pulses of result train A are derived as soon as produced.

Branch 28, of course, could have been taken directly from terminal 7 and tube 29 could have been controlled by pulses $T_2$. In this case the derivation of the output train would not have been modified but it would have a phase lag of $\theta/2$ presented with respect to the entering trains. It has been considered simpler to assure displacement of one code element of the output train with respect to the two input trains for the corrected result of operation. Otherwise it would have been necessary to restore the phase relation by adding after take off a further delay section of delay line $\theta/2$.

Point 16 is connected over 17 to the control grid of tube 18 which is rendered conducting only when pulses $T_2$ are applied on its suppressor grid. The pulses of train C are thus selected before being transmitted to terminal 5. Upon this same terminal at instants $T_1$, the pulses of coded train A are applied. These pulses are derived over input stage 11 from the common output plate in reinjection stage 18. Stage 11 receives at its control grid the coded train A, and at its suppressor grid the reshaped deblocking pulses from terminal 49.

Alternatively the selection of the pulses of train C before delay $\theta/2$ can be assured by means of a gate stage controlled by pulses $T_1$. Branch 28 is then taken off terminal 7. Such variation however appears to lead to a circuit which is less simple because it subdivides the functions of delay line 15 into two independent delay lines, one at the output of gate stage 18 thus arranged, the other in branch 18 or at the output of stage 29.

On the other hand, it is often necessary to maintain a stage for reshaping the pulses at the output of line 15 and it is simpler to achieve simultaneously this type of reshaping and the selection of pulses from train C.

A typical example of the case where the half-adder introduces a certain transmission delay as well as a relative shift of the entering trains at its terminals is indicated in the schematic of Fig. 4. In this case half-adder 1 consists in substance of a flip-flop stage of double stability. It contains the two tubes 50 and 51 symmetrically paired together by means of resistance capacity networks between plates and control grids, for example. The arrangement of the flip-flop stage shown is known. The trigger input is at 52 symmetrical with respect to its control grids. Moreover, there is an input at 54 for restoring the circuit to zero and to bring the flip-flop stage to rest, with tube 50 deblocked and tube 51 blocked, after it has been previously put to work with tube 51 deblocked and tube 50 blocked. The output plate of tube 50 controls over voltage divider bridge 55 the suppressor grids of stage 3 for the D. C. output at 7 of train "Or," and of stage 34 for the conditioned output at 7' of the same train "Or" for subtract carries. The output plate of stage 34 operates the control grid for the subtraction carry tube 32; stage 34 must be non-conducting if there exists a pulse of coded train A or coded train C in the same code element. The output plate of 34 is conected to output terminal 8 of the operator which in turn at 21 operates the delay line for the carries. This delay line is of similar constitution as line 19—20 of Fig. 3, and its values will be indicated further below. The output of the line supplies the control grid of stage 25 for reintroducing the carries into the input of the half-adder. The output plate of tube 51, in turn, is simply connected over voltage divider bridge 56 to the suppressor grid of stage 4 delivering at 8 the train "And," if deblocked for addition operation. One or the other of stages 4 and 34 is alone active for an operation of addition or subtraction, respectively. This occurs, for example, under control of their respective plate potentials in accordance with the plate tensions of the two tubes of control stage 37. Here also, if the double control of tubes 4 and 34 from their plates and suppressor grids becomes undesirable from the point of view of security of function these stages may be divided into two stages in cascade, one controlled by the operator, the other by the flip-flop stage for the sign.

Output 7 of the operator is connected to the control grid of tube 29 for the output of the result pulse train S. This tube receives at its suppressor grid the sequence of blocking pulses $T_1$. It will be explained that the half-adder introduces at terminals 7 and 8 a delay $\theta/2$ in such a manner that the selection of the output pulses occurs simultaneously with the appearance of pulses 7, without supplementary delay.

Output 7 is also connected to the control grid of stage 18 for reinjection of the pulses of train C. This is achieved over delay line 15 which is similarly constituted in time delay as the corresponding line of Fig. 3. Line 15 presents here an additional terminal 57 to apply the pulses of train C on blocking connection 53 of stage 32 after polarity inversion at 58. Stage 58 serving for the selection of pulses from train C is rendered conducting only when its suppressor grid receives pulse sequence $T_1$.

Tube 32 should in effect be blocked at code elements at which it can receive subtractive carry pulses from output 7′ and at which in addition there can exist concrete pulses in trains A and C. It blockage is assured by applying at the voltage divider bridge 59 the two pulse sequences A and C in negative polarity. The pulses of train C originate from tube 58, the pulses from train A from an auxiliary tube 60.

The control grid of the latter tube has applied thereon the pulses of train A at instants at which pulse sequence $T_2$ has been applied on its suppressor grid. Train A has been delayed by $\theta/2$ prior to its application on tube 60. This is achieved by delay line 61 which requires this time for its passage. Coded train A is taken off from another terminal 62 of that line and is applied on tube 11.

Coded train B over delay line 63 is applied on tube 13. A half-adder of the flip flop type will apparently operate only upon application of successively entering pulses. The division in time of the pulses is indicated in a simple graph shown on the top of Fig. 4. A code element of duration $\theta$ is considered as divided into six portions each lasting $\theta/6$. At zero and $\theta/2$, there are applied pulses to put the stage to rest with a slight delay sufficient to assure readouts of the condition of the stage; this is done by applying at these instants $T_1$ and $T_2$, pulses of the rhythm $\theta/2$ of that phase. These pulses are applied on the control grids of tubes 3, 4 and 34. In the first half of each code element, at $\theta/6$ and $2\theta/6$ (or $\theta/3$), respectively, trains A and B out-phased. In lines 61 and 63 are applied on input tubes 11 and 13. In the second half of each code element at $4\theta/6$ (or $2\theta/3$) and $5\theta/6$, respectively, trains R and C are applied on input tubes 25 and 18. The pulses of train R can be formed at instants $T_1$ and $T_2$, i. e., at zero and $\theta/2$ of each code element and must be fed back to stage 25, during the following code element at the instant $2\theta/3$ of that code element. Section 19 of the carryover delay line has a length of $2\theta/3$ and section 20 a length $\theta/2$. The carry pulses arrive then on tube 25 in order to be applied on stage 2 at appropriate instants when tube 25 is deblocked under control of recurring pulses of rhythm $\theta$ and phase $2\theta/3$. These pulses designated as $T_5$, are applied on the suppressor grid of that tube 25.

Pulses "Or" are excited at instants $T_1$ and $T_2$, i. e., at zero and $\theta/2$ of each code element. Those of the pulses produced at instants $T_1$ must be selected as output pulses. Pulses produced at instants $T_2$ are those which should be reinjected into the input of the flip-flop stage as pulses of trains C. Delay line 15 up to its output tap to stage 18 has a length of $\theta/3$. This point is reached between instants $T_2$ and $T_6$ in the graph of Fig. 4. The suppressor grid of tube 18 receives for blocking a sequence of recurring pulses $T_6$ of rhythm $\theta$ and phase $5\theta/6$.

Apparently the pulses of entering code trains A and B must be delayed by $\theta/3$ and $\theta/6$ prior to being applied on their input tubes 11 and 13. The suppressor grids of tubes 11 and 13 will receive the deblocking pulse sequences $T_4$ (sequence $T_1$ delayed by $\theta/3$) and T3 (sequence $T_1$ delayed by $\theta/6$).

Under these conditions, the operation of the calculator is the same as explained previously. With reference to the numerical example in Fig. 2, the graph of operation will be the same except of course that the distribution of the various pulses in time will be different since it would be that shown for one code element in the graph of Fig. 4. The process mechanism of operation remains unchanged as can be easily verified. It therefore need not to be discussed in detail.

The calculators according to the invention can be established to achieve simultaneously several additions and/or subtractions. This implies as is well understood a certain limitation as regards the minimum duration of the code elements because a time interlaced multiplex operation requires by itself a subdivision in time of each code element into as many portions as there are pairs of coded pulse trains to be dealt with.

For example, in order to achieve simultaneously two operations of addition and/or subtraction of two pairs of numbers represented by two pairs of entering code trains, it will be necessary to consider each code element as divided in two halves. In order to put the invention into practice and to utilize only one single half-adder each half of the code element must be considered itself divided into two quarters of code element. Fig. 5 illustrates adaptation of the schematic of Fig. 1 to such an application. It is sufficient for this purpose to provide two additional input channels, at terminals 10′ and 14′ for two more code trains A′ and B′. These trains are applied on these terminals with a phase-shift of $\theta/2$ relative to trains A and B on terminals 10 and 11. There is also provided an additional output channel 28′ to 30′ for deriving the result train of the operation performed on trains A′ and B′. Frequently it will not be necessary to employ additional input channels provided the time interlaced mixture of trains A and A′ and B and B′ respectively is achieved prior to their application to the device. These trains so mixed as to present a relative phase shift of $\theta/2$ are then applied to the single existing pair of input channels. Stages 18 and 25 serve for the controlled transfer of partial result and carry pulses; they are controlled by a deblocking pulse sequence $T_7$ of rhythm $\theta/2$ displaced by $\theta/4$ relative to the entering code trains at 5 and 6. The delay time of line 15 is taken equal to $\theta/4$, the delay of section 20 likewise; the delay of section 19 is maintained at $\theta$. Stage 29 can be rendered conducting by above mentioned pulse sequence $T_2$. This will serve to obtain the output of the trains applied at instants $T_1$ on the input terminals. Stage 29′ can be rendered conducting by above mentioned pulse sequence $T_1$. This will serve to the output of the result train the operation performed on the trains applied at instants $T_2$ on the input terminals. Alternatively a delay $\theta/2$ can be introduced in one of channels 28 and 28'; or one of these channels can be directly connected to terminal 7. In this way output is assured for the two result trains in phase with one and another. The same sequence of deblocking pulses of $T_1$ or $T_2$, as the case may be, will then be applied to render the two stages 29 and 29' conducting. It is recommended to feed the outputs of these stages back to one of the pairs of input terminals after a delay T. T designates the maximum duration of any of the trains to be dealt with. Any operation involving additions and subtractions in various combinations of four numbers can thus be conducted in two consecutive cycles. As it is always possible to keep switching the stages 33 and 34 over at intervals of $\theta/2$.

The graph of Fig. 6 illustrates the case of a double operation, thus conducted by the computer circuit of Fig. 5. One operation is an addition, the other a subtraction. It is also assumed that both trains A and A' represent the same numbers 53, and both trains B and B' representing the same numbers 27.

Figs. 7 and 9 now revert to the layout of Fig. 1 to show various modifications of this arrangement which can be utilized for obtaining the subtraction carry pulses.

In the embodiment of Fig. 7 the process of forming these subtractive carry pulses is such as has been discussed at the start of this description under point 4; stage 32 receives at its control grid, for example in positive polarity, the pulses of the mixture of trains B and R which appear in time interlaced relation on terminal 6. Stage 32 is normally conducting but it suppressor grid receives in negative polarity the output pulses of terminal 8, pulses of train "And" of the addition carry. Each pulse derived from terminal 8 makes stage 32 non-conducting, suppressing transmission of the carry pulse. This is because coincidence of a pulse at 6 and a pulse at 8 cannot give rise to a carry.

In the embodiment of Fig. 8, the subtraction carry pulse circuit is such as has been discussed above under point 1. Stage 32 again receives at its control grid the time interlaced trains B and R at terminal 6. Its suppressor grid receives the time interlaced mixture of trains A and C at terminal 5 in negative polarity. This will block stage 32 each time there exists a concrete pulse in these trains A and C.

In the embodiment of Fig. 9, stage 32 receives at its control grid through connection 65 the pulses derived from terminal 6. Its suppressor grid receives then over connection 66, the pulses originating from terminal 7 in positive polarity. This will render stage 32 conducting, a stage normally blocked by its biassing voltage of the suppressor grid. This process of formation corresponds to the above mentioned point 3; in this case a subtraction carry must be produced each time there exists at the code element a pulse of train B (or R) and a pulse of train "Or" of the calculator.

In an operation of addition or subtraction numbers B and R play similar parts with respect to point 8. It is therefore possible as a plain alternative of the layout of Figs. 1–9, to permutate the times of application of trains B and R to terminal 6. Fig. 10 shows such a case where there is obtained by inserting at 67 between input 14 of train B and input 6 a delay element of say $\theta/2$. Carry R must arrive prior to pulses B and therefore each of sections 19' and 19'—20 of the double channel of reinjection must be shortened by $\theta/2$. This means a shortening of delay section 20 by $\theta/2$; whereby a delay value of $\theta$ becomes $\theta/2$. In addition, stage 25 must be rendered conducting by the pulse sequence $T_1$ instead of being rendered conducting by pulse sequence $T_2$.

Referring again to the numerical example already given, the graphs of pulses of Fig. 2 become now those of Fig. 11 for the lines of $B_1$ to $S_{1s}$. The process of forming the output pulses of the half-adder at terminals 7 and 8, remain the same as before. For example at the first code element, the pulse of the train A which appears at the start of that moment on terminal 5 produces at 7 a partial result pulse which will be fed back at 5 at $\theta/2$ of that code element while there appears at 6 the delayed pulse $B_1$ of code train B at its first element. There results the additive carry pulse $R_{1a}$ which after a delay of $\theta/2$ will arrive at terminal 6 at the instant of the start of the second code element. It will produce the second pulse trains $C_{1a}$ at $\theta/2$ of that code element and so on in accordance with the configurations of the trains represented in Fig. 11.

It is interesting to note, if in Fig. 10 application of code trains A and B on terminals 10 and 14 is interchanged with code train A delayed by $\theta/2$ and arriving at terminal 6, the calculator still operates for an addition. This is demonstrated in graphs $A_2$ to $S_{2a}$ of Fig. 11. This is easy to understand by reference to the type of calculator with two partial operators in cascade, wherein the sum $(B+R)$ is formed in the first place and in accordance with the patent application mentioned above.

This interchange, however, cannot be a plain one if the circuit is to operate in subtraction. In this case, in the first cycle of operation, the calculator must operate permanently to form the sum $(B+R)$ while in the second case it must operate to subtract from A the corrected result of addition $(B+R)$. It is necessary, therefore, to provide additional means to assure the correct operation of the calculator if according to the schematic of Fig. 10 code train A is applied on terminal 14 and code train B on terminal 10.

This additional means consists, in the first place, of assuring the switching over at rhythm $\theta/2$, and for the stages 33 and 34. In the case of subtraction, stage 33 is deblocked by pulse sequence $T_1$ and stage 34 by pulse sequence $T_2$. In the case of addition for example, stage 33 would be deblocked by the two pulse sequences $T_1$ and $T_2$ in time interlaced relation.

In the second place a modification of the configuration of the calculator can be assured for example in the manner shown in Fig. 12. While in this figure a production of subtractive carry pulses can be assured by any of the above dispositions, it is also provided to maintain separate the two branches of the double channel for reinjection of carry pulses reports. In this way, terminal 8 of the output of train "And" is permanently connected to point 21 acting upon delay element 68 of electrical length $\theta$. Gate stage 25 at terminal 27 is rendered conducting by applying pulse sequence $T_1$ in phase with coded train B which in turn operates on terminal 14 and without delay on terminal 5. This disposition serves in all cases to assure addition of the coded trains B and R. This is due to the fact that the same terminal 8 is also connected over gate 33 to point 21' of the second branch containing delay element 19' of electrical length $\theta/2$. Interruptor 33 conducts in case of addition. The two additive carry sequences delivered at terminal 8 at instants $T_1$ and $T_2$ will then be fed back to gate 25 at instance $T_1$.

In case of subtraction, the carry pulses delivered at 8 at instants $T_2$ must be erased. This is assured by controlling stage 33 which is rendered non-conducting. The pulses of these carries at instants $T_2$ cannot be applied on stage 25 over channel 68 of delay $\theta$ except at instants $T_2$ of the code element. At these instants, stage 25 is blocked.

On the other hand the subtractive carries are produced at instants $T_2$ by comparing train mixtures B—C and A—R at terminals 5 and 6 respectively. Connection 65 blocks stage 32 supplied from connection 53. Thus, the subtractive carries are not permitted to arrive at point 21' of the input delay section 19' except at instants $T_2$ only. This is due to the condition of stage 69 having a control grid at which there are applied the subtractive carry pulses, desired as well as undesired. At its suppressor grid, however, only deblocking pulses $T_2$ are applied. In the absence of pulses $T_2$, stage 69 remains blocked and as a result these pulses must not be applied except during a subtraction operation but never during an operation of addition. It is therefore necessary, in order to cause the calculation to function correctly, that pulses $T_2$ applied at 71 pass stage 34 before attaining connection 70. Stage 34 is the same as in the preceding figures.

The pulse graphs for a subtraction operation in a calculator according to the schematic of Fig. 12 are given in Fig. 13. The numerical example chosen in the present description is retained. These graphs need not to be discussed in detail. Apparently each pulse of train B—and to the same extent each pulse from train C—which does not coincide with a pulse of delay train A, say $A_2$, will give rise to a result pulse $S_{2s}$ and a carry pulse $R_{2s}$. Report pulse $R_{2s}$, if not coinciding with a pulse of train B will be fed back as much as a pulse from train C; if coexisting with a pulse from train B it will be carried over output 8 and reinjection channel 68. Each carry pulse between A and C is not retransmitted by stage 25; it arrives at an instant $T_2$ at which that stage is non-conducting.

It is apparent that the invention may be put into practice in many different ways without exceeding the scope of this invention. This particularly pertains to the construction of half-adder 1. Fig. 14 completes the preceding examples of Figs. 3 and 4. Reference is had to a half-adder construction which utilizes unidirectional elements operated in a network. The network is controlled by the code trains and at the same time also by the control voltages of the "sign" or symbol for addition or subtraction. It assures that the pulse voltages established with respect to a constant voltage be appropriately directed toward the outputs for output S and carry R. Such construction for the partial operator may be deduced directly from the dispositions provided in patent application Serial Number 258,202, filed in the United States on November 26, 1951, under the title Electric Adder-Subtractor Devices.

For incorporation in calculators according to this invention it should be borne in mind that it is sufficient to add to the schematic of Fig. 14 the two reinjection channels for the partial result and the carry, shown in Figs. 1, 5, and 7–10. It is not necessary to provide particular means for obtaining subtraction reports except those directly incorporated in the detector network. Trains A and C are applied for example on terminal 5; trains B and R on terminal 6. The voltage controlling operation (addition or subtraction) is applied on terminal 37. The channels of reinjection and output are taken off at 7 and 21, respectively.

Conductor or point 72 for the application of a continuous high voltage is the start of three separate channels which extend over resistances 72, 73 and 75. The two first channels are connected over unidirectional conductors 78 and 79 to point 7. The third channel is connected over unidirectional conductor 86 to point 21. The second channel is subdivided by resistances 82 and 83, and resistance 83 is connected over unidirectional conductor 88 to point 21. If necessary, this subdivision makes use at the point indicated, of a separator stage, preferably arranged as cathodyne (operated at its grid over resistance 74; outputs 82 and 83 being taken off at the terminals of the bias resistance in the cathode ground connection of the stage).

Channel 73—78 extends into two branches containing crystals or detectors 76 and 77 respectively. Channel 74—79 prior to the point of duplexing, extends into branches with crystals 80 and 81. Channel 75—86 extends into branches with crystals 84 and 85. Channel 83—88 extends into a branch having crystal 87.

The ends of detectors 76 and 98 are connected to plate *θ* of triode element 89 of twin triode 89—90. Plate 1 of element 90 of this twin triode is connected to detector 80. Crystals 81 and 84 are connected to plate *θ* of element 92 of twin triode 92—93. Plate 1 of element 93 is connected to crystal 77. Detectors 87 and 85 are respectively connected to the plates of elements 95 and 96 of a third twin triode with plates respectively marked (+) and (−).

By means of grid bias, triode elements 89—90, 92—93 and 95—96 are rendered capable of inverse conditions of conductibility. At rest, elements 89, 92 and 95 are conductors; elements 90, 93 and 96 non-conductors. Their cathodes are grounded. As a result ground is applied on channel 73—78 over element 76; on channel 74—79 over element 81; on channel 75—86 over element 84; and on channel 83—88 by element 87. The voltage applied at 72 cannot be directed by any channel to points 7 and 21 since all these channels lead to ground. In order that it may reach one of these two points or both it will be necessary that one of the channels which terminates there, does not present any more such a derivation to ground. In other words, it will be necessary that the corresponding triode elements become non-conductors and insulate the detectors of these channels from ground.

The relative condition of elements 89—90, 92—93 and 95—96 can be reversed for each twin triode by a control voltage applied in positive polarity on terminal 5, 6, or 37 for operating triode 91, 94, or 97, which are non-conducting at rest (in the absence of such voltage). This is due to the fact that the plate of triode 91 is connected to the grids of triode element 89. The cathode of triode 91 is connected to the grid of triode element 90. This is why a pulse of positive voltage at 5 renders triode 91 conducting, delivers a negative blocking pulse for element 89 in the plate and a positive deblocking pulse for element 90 in the cathode. The same applies to the two other arrangements of twin triode and control tube.

It should be noted that the duration at which a control voltage is applied at 5, 6 or 37 is unimportant for the realization of the inversion of the condition of the twin triode. As a consequence, in stage 95—96 controlling the "sign" of operation, the voltage controlling subtraction could be applied at 37 during a complete cycle of operation if desired. The action is the same as if terminal 37 would receive a sequence of recurring pulses during that cycle.

If for example, at an instant of operation, a pulse is applied at 5 without any pulse at 6 and without a sign voltage at 37, channel 73—78 is insulated from ground because triode 89 becomes non-conducting and triode 83 remains non-conducting. A result pulse appears at 7 of a duration conditioned by the duration of the pulse at 5. Channels 74 and 75 remain at ground due to triode element 92 being conducting. In this way the result of an operation subtraction or addition is obtained: $A=1$, $B=0$, hence $S=1$ and $R=0$.

If now at an instant of operation a pulse is applied at 5 and a pulse at 6, channels 73 and 74 are maintained at ground, due ot triode element 93 and 90 being rendered conducting. Channel 75 is insulated from ground and in case of addition is entirely insulated from ground because triode element 96 is non-conducting. As a result at 21 a remainder carry pulse issues. In case of subtraction, channel 75 is maintained at ground by triode 96 which is conducting; there is no carry. For $A=1$ and $B=1$, there is now $S=0$ and $R(+)=1$ or $R(-)=0$.

If now, at an instant of operation, no pulse is applied at 5 but a pulse is applied at 6, channel 74 alone is insulated from ground and a pulse appears at 7. In case of addition, channel 83—88 is maintained at ground; there is no carry pulse. In case of subtraction, channel 83—88 is insulated from ground and by derivation from channel 74, there is a carry pulse. For $A=0$, $B=1$, there is now $S=1$, with $R(+)=0$ or $R(-)=1$.

Still more modifications can be provided for the realization of the calculator in accordance with the present invention without exceeding the scope thereof.

I claim:

1. In a calculator for selective addition and subtraction of at least one pair of numbers represented in binary fashion by coded trains of electric pulses, a single half-adder including input means for receiving said coded trains, phase comparing means for determining pulse coincidence and pulse anticoincidence between said coded pulse trains and separate outputs under control of said phase comparing means for producting respectively at least one train under control of pulse coincidence and at least another train under control of pulse anticoincidence, means for delaying each of said output trains by predetermined time intervals, means for feeding back delayed output pulses into said input means so as to arrive there at successive pulse periods respectively but out of phase with the incoming pulse trains; and means for selecting from said anticoincidence output, output pulses of predetermined phase relation with the one and the other of said incoming pulse trains.

2. Calculator according to claim 1 wherein said delaying means for said anticoincidence controlled output pulses correspond to a time interval of less duration than a pulse period with respect to incoming pulses.

3. Calculator according to claim 1 wherein said feedback means include a feedback circuit from an anticoincidence controlled output to one input, means in said feedback circuit for delaying anticoincidence controlled pulses by a predetermined time interval, gating means between said delaying means and said intput for reapplying to said input those of the anticoincidence controlled output pulses only which appear at said gating means out of phase by said first-mentioned predetermined time interval with the incoming coded pulse train at said same input, and an output circuit coupled to said first feedback circuit between said gating means and said delaying means, gating means in said output circuit for transmitting those of the anticoincidence controlled pulses only which arrive there in phase with said incoming pulse train.

4. Calculator according to claim 1 wherein said feedback means includes a feedback circuit from the coincidence controlled output to said input means; said feedback including a delay element in series with two parallel branches connected to said input means, one branch carrying coincidence controlled output pulses delayed by a time interval equal to one pulse period and the other branch containing a further delay element and carrying coincidence controlled output pulses delayed by a time interval equal to one pulse period plus a predetermined time interval, and gating means between said delay branches and said input means for reapplying to said input means those of the coincidence controlled output pulses which arrive at said gating means out of phase by said first-mentioned predetermined time interval with the incoming pulse train at said input means.

5. Calculator according to claim 1 wherein said feedback means include a first feedback circuit from an anticoincidence controlled output to one input, means in said first feedback circuit for delaying anticoincidence controlled pulses by a predetermined time interval, gating means between said delaying means and said input for reapplying to said input those of the anticoincidence controlled output pulses only which appear at said gating means out of phase by said first-mentioned predetermined time interval with the incoming coded pulse train at said same input, an output circuit coupled to said first feedback circuit between said gating means and said delaying means, gating means in said output circuit for transmitting those of the anticoincidence controlled pulses only which arrive there in phase with said incoming pulse train; and a second feedback circuit from the coincidence controlled output to one other input; said feedback including a delay element in series with two parallel branches connected to said other input, one branch carrying coincidence controlled output pulses delayed by a time interval equal to one pulse period and the other branch containing a further delay element and carrying coincidence controlled output pulses delayed by a time interval equal to one pulse period plus a predetermined time interval, and gating means between said delay branches and said other input for reapplying to said other input those of the coincidence controlled output pulses which arrive at said gating means out of phase by said first-mentioned predetermined time interval with the incoming pulse train at said other input.

6. Calculator according to claim 5 wherein said feedback circuit includes a carry pulse feeder connecting at subtraction said anticoindicence output to said first input, another feeder being provided connecting said coincidence output to said carry pulse feeder.

7. Calculator according to claim 1 comprising at subtraction a carry pulse feeder connecting said anticoincidence output to said input means.

8. Calculator according to claim 1 comprising at subtraction a carry pulse feeder connecting said anticoincidence output to said input means, and another feeder connecting said coincidence output to said carry pulse feeder.

9. Calculator according to claim 1 wherein said feedback means include a first feedback circuit from an anticoincidence controlled output to one input, means in said first feedback circuit for delaying anticoincidence controlled pulses by a predetermined time interval, gating means between said delaying means and said input for reapplying to said input those of the anticoincidence controlled output pulses only which appear at said gating means out of phase by said first-mentioned predetermined time interval with the incoming coded pulse train at said same input, an output circuit coupled to said first feedback circuit between said gating means and said delaying means, gating means in said output circuit for transmitting those of the anticoincidence controlled pulses only which arrive there in phase with said incoming pulse train, and a second feedback circuit from the coincidence controlled output to one other input; said second feedback including a delay element in series with two parallel delay branches, both connected to said other input, one branch carrying coincidence controlled output pulses delayed by a time interval equal to one pulse period and the other branch carrying coincidence controlled output pulses delayed by a time interval equal to one pulse period plus a predetermined time interval, and gating means between said delay branches and said other input for reapplying to said other input those of the coincidence controlled output pulses which arrive at said gating means out of phase by said first-mentioned predetermined time interval with the incoming pulse train at said other input, there being provided means for applying said incoming pulse train to said other input with a predetermined phase lag relative to the time of application of the incoming pulse train to said input.

10. Calculator according to claim 9 wherein said feedback circuit includes a carry pulse feeder connecting at subtraction said anticoincidence output to said first input; another feeder being provided connecting said coincidence output to said carry pulse feeder; said phase lag being equal to said first-mentioned predetermined interval.

11. In an electrical device for selectively adding and subtracting binary-scale numerical quantities represented by coded pulse trains having pulse periods occurring in the sequence of increasing significance of the digits of the numerical quantities a single half-adder including a pulse coincidence circuit, a pulse anticoincidence circuit, and a pair of input terminals for two incoming coded pulse trains, and a pair of output terminal for pulse trains comprising coincidence pulses, called hereinafter output "And," and anticoincidence pulses, called hereinafter output "Or," respectively, means for delaying by a predetermined time interval the pulse appearing at the "Or" output terminal and for feeding the pulses thus delayed back to one input terminal so as to arrive there out of phase with the incoming pulse train applied thereto; means for delaying by a predetermined time interval the pulses appearing at the "And" ouptut terminal and for feeding the pulses thus delayed back to the other input terminal so as to arrive there during the next pulse period and out of phase with the incoming pulse train applied thereo; means for selecting those of the pulses appearing at the "Or" output terminal which are in a predetermined phase relation with the one and the other of said imcoming pulse trains, and an output conductor for receiving the selected pulses.

12. Calculator according to claim 11 wherein the "Or" pulses are delayed by a time interval of less duration than a pulse period.

13. Calculator according to claim 11, wherein said feedback means includes a first feedback channel from the "Or" output to one input terminal, means in said first feedback channel for delaying the "Or" pulses by said first-mentioned predetermined time interval, gating means between said delaying means and said input terminal for reapplying to said input terminal those of the "Or" output pulses only which appear at said gating means out of phase by said first-mentioned predetermined time interval with the incoming coded pulse train applied to the same input terminal, and output channel connected to said gaitng means and said delaying means, gating means in said output channel for transmitting those of the "Or" pulses only which arrive there in phase with said incoming pulse train, a second feedback channel from the "And" output terminal to the other input terminal of the half-adder, said second feedback channel containing a network of two parallel branches, and means in one of said branches for delaying by a time interval equal to one pulse period the "And" output pulses, and means in the other of said branches for delaying by a time interval equal to said first-mentioned predetermined time interval the "And" output pulses which arrive at said gating means out of phase by said first-mentioned predetermined time interval with the incoming pulse train applied to said other input terminal.

14. Calculator according to claim 13 wherein said first feedback circuit includes a carry pulse feeder connecting at subtraction said "Or" output to said first input terminal, and another feeder connecting said "And" output to said carry pulse feeder.

15. Calculator according to claim 11 wherein said feedback means include a carry pulse feeder connecting at subtraction said "Or" output to said first input terminal, and another feeder connecting said "And" output to said carry pulse feeder.

16. In a calculator, pulse coincidence and pulse anticoincidence detectors, having common inputs corresponding to a plurality of incoming pulse trains and a separate output for each of said detectors, a feedback circuit including delay means coupling a coincidence output to an input, and an anticoincidence output to another input to permit passage of pulses of predetermined phase only with respect to the incoming pulse trains; and means for selecting from one of said feedback circuits pulses that due to their phase are not fed back to the input coupled thereto.

17. Calculator according to claim 16, wherein one of said delay means includes several series connected delay elements, and short circuiting means for bypassing one of said delay elements.

18. Calculator according to claim 16 comprising time gated transfer means in at least one of said feedback circuits, to permit passage of pulses at predetermined instances only.

19. Calculator according to claim 16, comprising switching means in at least one of said feedback circuits, to permit passage of pulses at instances only different from those at which pulses from the incoming trains are applied to the corresponding input.

20. Calculator according to claim 16 comprising switching means in at least one of said feedback circuits, to permit passage of pulses at instances only different from those at which pulses from the incoming trains are applied to the corresponding input, said switching means being under control of the repetition frequency of the train pulses.

21. Calculator according to claim 16 wherein each of said feedback circuits comprises a switching means under control of the repetition frqeuency of the train pulses to permit passage of pulses at instances only different from those at which pulses from the coded trains are applied to their respective inputs.

22. Calculator according to claim 16 wherein said selecting means are coupled to the anticoincidence feedback circuit, and include switching means controlled in the rhythm of the train pulses at predetermined instances so that from the delayed anticoincidence pulse train only those pulses are selected that due to their phase cannot feed back into the corresponding input.

23. Calculator according to claim 16 wherein the delay means in each of said feedback circuits include one element causing a delay of half a train pulse there being in one of said feedback circuits another delay element in series with said first delay element having an electrical length causing delay by a full train pulse.

24. Calculator according to claim 16 wherein said output selecting means include switching means controlled in the rhythm of train pulses in phase with the application of incoming trains on the inputs.

25. Calculator according to claim 16 comprising switching means in each of the feedback circuits controlled in the rhythm of train pulses but out of phase by half a train pulse with respect to the application of incoming trains at their respective inputs.

26. Calculator according to claim 16 comprising switching means coupling one of said output to the other, said switching means being rendered non-conducting any time there exists a concrete pulse in one or the other of the trains applied on the intput fed back from one of said outputs.

27. Calculator according to claim 16 comprising switching means coupling each of said outputs to said coincidence feedback circuit; said switches being normally non-conductive and alternatingly conductive to transmit addition and subtraction carries respectively.

28. Calculator according to claim 16 comprising gating means for selecting the final output pulses from the anticoincidence output.

29. Calculator according to claim 16, comprising switching means coupling coincidence and anticoincidence outputs and rendered non-conducting any time there exists a concrete pulse in one or the other of the trains applied on the input fed back from one of said outputs.

References Cited in the file of this patent

UNITED STATES PATENTS

| | | |
|---|---|---|
| 2,590,950 | Eckert | Apr. 1, 1952 |
| 2,600,744 | Eckert | June 17, 1952 |
| 2,610,790 | Elliot | Sept. 16, 1952 |
| 2,611,536 | Barrow | Sept. 23, 1952 |
| 2,646,501 | Eckert | July 21, 1953 |

FOREIGN PATENTS

| | | |
|---|---|---|
| 1,008,424 | France | Feb. 20, 1952 |

OTHER REFERENCES

Proc. of the IRE, "The BINAC," by Auerbach et al., pages 12–29, January 1952.

"The Transistor," by Bell Telephone Lab. Inc., New York, page 671. Copyright 1951.

"Theory and Techniques for Design of Electronic Digital Computers," Moore School of Elec. Engineering, Univ. of Pa. (1). Pages 47–9 to 12 and dwg. 47–14, total 5 pages.